United States Patent [19]

Miller et al.

[11] Patent Number: 5,302,567
[45] Date of Patent: Apr. 12, 1994

[54] ZEOLITE OCTANE ADDITIVE

[75] Inventors: James G. Miller, Ellicott City; Robert R. Gatte, Columbia, both of Md.

[73] Assignee: W. R. Grace & Co.-Conn., New York, N.Y.

[21] Appl. No.: 787,170

[22] Filed: Nov. 4, 1991

[51] Int. Cl.$^5$ .............................. B01J 29/06
[52] U.S. Cl. ................................ 502/67; 502/64
[58] Field of Search ........................... 502/67, 64

[56] References Cited

U.S. PATENT DOCUMENTS

| | | | |
|---|---|---|---|
| Re. 28,629 | 11/1975 | Maher et al. | 423/112 |
| 3,140,249 | 7/1964 | Plank et al. | 208/120 |
| 3,293,192 | 12/1966 | Maher et al. | 252/430 |
| 3,352,796 | 11/1967 | Kimberlin, et al. | 252/455 |
| 3,647,718 | 3/1972 | Haden, Jr. et al. | 252/455 Z |
| 3,758,402 | 9/1973 | Oleck et al. | 502/67 |
| 3,758,403 | 9/1973 | Rosinski et al. | 208/120 |
| 3,894,931 | 7/1975 | Nace et al. | 208/73 |
| 3,894,933 | 7/1975 | Owen et al. | 208/77 |
| 4,061,724 | 12/1977 | Grose et al. | 423/335 |
| 4,137,152 | 1/1979 | Chester et al. | 208/120 |
| 4,289,606 | 9/1981 | Gladrow et al. | 208/120 |
| 4,309,279 | 1/1982 | Chester et al. | 208/120 |
| 4,309,280 | 1/1982 | Rosinski et al. | 208/120 |
| 4,340,465 | 7/1982 | Miller et al. | 208/120 |
| 4,368,114 | 1/1983 | Chester et al. | 208/120 |
| 4,493,902 | 1/1985 | Brown et al. | 502/65 |
| 4,522,705 | 6/1985 | Chu et al. | 208/120 |
| 4,549,956 | 10/1985 | Chu | 502/67 |
| 4,581,341 | 4/1986 | Himpel | 502/68 |
| 4,614,578 | 9/1986 | Chester et al. | 208/120 |
| 4,740,292 | 4/1988 | Chen et al. | 208/120 |
| 4,752,375 | 6/1988 | Herbst et al. | 208/74 |
| 4,818,738 | 4/1989 | Chu et al. | 502/67 |
| 4,899,007 | 2/1990 | Chu et al. | 585/467 |
| 4,929,337 | 5/1990 | Herbst et al. | 208/120 |

FOREIGN PATENT DOCUMENTS 9118851 12/1991 European Pat. Off. .

Primary Examiner—Carl F. Dees
Attorney, Agent, or Firm—Edward J. Cabic

[57] ABSTRACT

When a zeolite additive composition of a medium-pore zeolite with a Constraint Index from about 1 to about 12 and a silica to alumina mole ratio greater than about 12 is added to a conventional cracking catalyst dispersed in an inorganic matrix, the octane will be improved, but there will be a yield loss in the amount of gasoline produced. An improvement in that catalyst system is obtained by partially exchanging the medium-pore zeolite additive with cations from one or more elements of Group IA, Group IIA or Group IIIA of the Periodic Table. The octane number of the gasoline-range product of an FCC process is still improved while the amount of the gasoline yield loss typically observed for such octane-enhancing additives is reduced.

12 Claims, No Drawings

ZEOLITE OCTANE ADDITIVE

BACKGROUND OF THE INVENTION

1. Field of the Invention

This invention relates to an improved zeolite-containing catalyst used for cracking hydrocarbon feedstocks in the absence of external hydrogen pressure.

2. Description of the Previously Published Art

For many years, cracking catalysts employing some form of faujasite type Y zeolite have been used to produce gasoline in the fluid catalytic cracking (FCC) process. Catalysts employing said zeolite in a matrix are disclosed in U.S. Pat. Nos. 3,140,249, 3,352,796, 3,647,718, 4,581,341 and 4,493,902. Recently, several disclosures have appeared which use mixtures of zeolite Y with other components to improve the octane of the resulting gasoline-range product. U.S. Pat. Nos. 3,758,403, 3,894,931, 3,894,933, 4,289,606, 4,309,279, 4,309,280 and 4,368,114 disclose the use of zeolite Y admixed with zeolite ZSM-5 in the FCC catalyst particle or the use of a mixture of two FCC catalysts, one a conventional cracking catalyst using Y and the other using ZSM-5, or the use of a conventional FCC catalyst with finely powdered ZSM-5 added to the charge stock to make higher octane gasoline. U.S. Pat. No. 4,137,152 discloses the use of catalysts composed of a mixture of Y and Mordenite. U.S. Pat. No. 4,740,292 discloses the use of catalysts composed of a mixture of zeolite Beta with a conventional zeolite Y cracking catalyst and European Patent No. 350,331 discloses the use of mixtures of zeolite L with zeolite Y catalysts, both for improved gasoline octane.

U.S. Pat. Nos. 4,340,465 and 4,614,578 disclose the use of FCC catalysts employing a ZSM-5 type zeolite with a high silica-to-alumina molar ratio ($SiO_2/Al_2O_3$ > approximately 500; also called "silicalite" in U.S. Pat. No. 4,061,724) in conjunction with a zeolite Y type cracking component to improve the octane of gasoline produced by the FCC process while reducing the gasoline yield penalty typically associated with the use of ZSM-5 type additives.

U.S. Pat. No. 4,899,007 discloses the alkylation of aromatics over metal impregnated zeolitic catalysts. The zeolite is ZSM-5 and the impregnated metals include Mg, Fe, Sr, Ca, Ba, Na, and Co.

3. Objects of the Invention

It is an object of this invention to produce a zeolite containing catalyst which improves the octane of the gasoline produced in an FCC process.

It is a further object of this invention to provide an additive to be used in conjunction with a typical FCC catalyst to improve the octane number of the gasoline product.

It is a further object of this invention to provide a partially cation-exchanged medium-pore crystalline aluminosilicate component additive to be used in conjunction with a typical FCC catalyst to improve the octane number of the gasoline while reducing the gasoline yield loss typically associated with such additives.

It is a further object of this invention to produce a modified ZSM-5 based additive to be used in conjunction with a typical FCC catalyst to improve the octane number of the gasoline while reducing the gasoline yield loss typically associated with such additives.

These and further objects will become apparent as the description of the invention proceeds.

SUMMARY OF THE INVENTION

The octane of the gasoline product in the FCC process is improved by using a partially cation exchanged ZSM-5 zeolite mixed with or formulated into a typical FCC catalyst. By the partial exchange of ZSM-5 with Group IA, Group IIA or Group IIIA cations such as K, Mg, Ca, Sr, Y and La, the resulting catalyst provides improved performance over non-exchanged ZSM-5 when used as an octane additive in FCC. The improvement is in the form of increased gasoline yield while maintaining comparable octane increases relative to those achieved using a non-exchanged ZSM-5 additive.

DESCRIPTION OF THE PREFERRED EMBODIMENTS

The fluid catalytic cracking catalysts which are combined with an octane increasing additive component, are conventional and well known to those skilled in the art. Typically, the catalysts comprise amorphous inorganic oxide gels such as silica-alumina hydrogels, and/or a crystalline zeolite dispersed in an inorganic oxide matrix.

Preferred zeolites with which the additive would be used are synthetic faujasite (type Y zeolite) and/or other large pore zeolites such as L, Omega, ZSM-4, Beta, and Mordenite. The type Y zeolites can be exchanged with hydrogen and/or rare earth metals, such HY and REY, and those which have been subjected to thermal treatments such as calcined, rare-earth exchanged Y (CREY) and/or Z14US are particularly suited for inclusion in fluid cracking catalyst compositions. Catalytically active zeolite components are typically described in U.S. Pat. Nos. 3,293,192 and RE 28,629.

The medium-pore zeolites used in the additive composition having a Constraint Index of about 1 to 12 and a silica to alumna ratio greater that about 12 are further described in U.S. Pat. No. 4,309,279, the disclosure of which is incorporated herein by reference. The members of the class of zeolites defined herein of the additive catalyst are exemplified by ZSM-5, ZSM-11, ZSM-12, ZSM-23, ZSM-35, ZSM-38 and other similar materials.

The catalysts of the present invention can preferably be prepared by partial cation exchange of a ZSM-5 zeolite or a ZSM-5 containing octane-additive catalyst with salts of Group IA, Group IIA or Group IIIA elements such as K, Mg, Ca, Sr, Y or La. The additives are typically composed of 5 to 50 wt % ZSM-5 zeolite in an inorganic oxide matrix and preferably at a level of 10–25 wt %. The zeolite component may be partially exchanged with cations prior to incorporation into the additive or the formulated, spray-dried additive may be exchanged with cations prior to use.

Zeolites are usually mixed with binders, fillers and functional additives to provide a composite catalyst. The term inorganic matrix refers to the non-zeolitic ingredients in the catalyst or additive. A variety of matrix components have been disclosed in the prior art. These include silica, alumina, silica-alumina, clay, silica-zirconia, silica-magnesia, aluminum phosphate and mixtures thereof. Methods of preparation of these matrix components have also been disclosed in the prior art. Matrix components chosen from among all of these disclosed inorganic oxide materials are contemplated for the additives of the present invention.

Additives based on ZSM-5 zeolite are used in the FCC process to enhance the octane number of the gasoline-range product over that produced by conventional cracking catalysts. However, when used, ZSM-5 additives cause a reduction in the total gasoline yield compared to the conventional cracking catalyst. The catalysts of the present invention are useful for reducing this yield penalty while maintaining the octane-enhancing performance of the ZSM-5 additive. The catalytic cracking process is conducted under cracking conditions in the absence of added hydrogen pressure. Preferred temperatures are in the range of 400° to 700° C. and the pressures are in the range of 0 to 5 atmospheres.

In one preferred embodiment, partial cation exchange of an additive, composed of 15% by weight of ZSM-5 zeolite and 85% matrix, with magnesium, calcium or strontium salts such as $Mg(NO_3)_2$, $CaCO_3$ or $SrCl_2$, results in improvement of the catalytic properties. The ZSM-5 additive is typically used in the range of up to 15% of the catalyst inventory. When tested in admixture with a conventional cracking catalyst, the modified additives produced lower gasoline yield loss at comparable octane gain as compared to the unmodified additive. Thus the catalysts of the present invention are useful in fluid catalytic cracking for the production of high-octane gasoline with a reduction in the yield loss typically associated with ZSM-5 octane additives. As will be seen in the following examples, using the metal exchanged ZSM-5 according to the present invention in combination with a Y zeolite results in a ratio of the change in MON (from the case without a ZSM-5 additive) to the negative change of gasoline product yield of preferably at least 0.25.

In addition to having the partially exchange medium-pore zeolite present in the FCC catalyst composition as a separate particulate additive in an inorganic matrix, it is also contemplated to add the medium-pore zeolite directly to the matrix of the large pore zeolite catalyst. The total amount of the medium-pore zeolite in the catalyst will be comparable to the amount discussed previously for the separate additive embodiment. In that embodiment the partial exchanging of the medium-pore zeolite can be done preferably before it is added to the catalyst.

When spray drying FCC catalyst particles it is desirable to produce particles having a size less than 200 microns.

Having described the basic aspects of our invention, the following examples, while not exhaustive, are presented as illustrations of the specific embodiments thereof.

EXAMPLE 1

This example describes the production of a calcium exchanged ZSM-5.

A slurry comprised of 10.0 g of a spray-dried ZSM-5 additive (15% ZSM-5, 85% matrix) and 200.0 ml of water was placed in a 500 ml round bottom flask equipped with a reflux condenser. While stirring 0.0357 g of $CaCO_3$ was added and the mixture was heated to and maintained at 80° C. for 1 hr. The slurry was filtered hot, washed three times with 200 ml of water and dried at 100° C. overnight. Chemical analysis: 0.36% CaO

EXAMPLE 2

This example describes another calcium exchanged ZSM-5.

A slurry comprised of 10.0 g of a spray-dried ZSM-5 additive as described in Example 1 above and 200.0 ml of water was placed in a 500 ml round bottom flask equipped with a reflux condenser. The pH of the slurry was adjusted to 4.5 with concentrated ammonium hydroxide solution. While stirring 0.0357 g of $CaCO_3$ was added and the mixture was heated to and maintained at 80° C. for 1 hr. The slurry was filtered hot, washed three times with 200 ml of water and dried at 100° C. overnight. Chemical analysis: 0.21% CaO.

EXAMPLE 3

This example describes the production of a magnesium exchanged ZSM-5.

A slurry comprised of 10.0 g of a spray-dried ZSM-5 additive and 200.0 ml of water was placed in a 500 ml round bottom flask equipped with a reflux condenser. While stirring 0.915 g of $Mg(NO_3)_2$ was added and the mixture was heated to and maintained at 80° C. for 1 hr. The slurry was filtered hot, washed three times with 200 ml of water and dried at 100° C. overnight. Chemical analysis: 0.10% MgO.

EXAMPLE 4

This example describes the production of a strontium exchanged ZSM-5.

A slurry comprised of 10.0 g of a spray-dried ZSM-5 additive and 200.0 ml of water was placed in a 500 ml round bottom flask equipped with a reflux condenser. While stirring 1.90 g of $SrCl_2 6H_2O$ was added and the mixture was heated to and maintained at 80° C. for 1 hr. The slurry was filtered hot, washed three times with 200 ml of water and dried at 100° C. overnight. Chemical analysis: 0.33% Sr.

EXAMPLE 5

The following example compares the catalytic performance of the modified ZSM-5 additives prepared in Examples 1 and 3 with the unmodified ZSM-5 additive. The additives were tested for gas oil cracking activity and selectivity using an ASTM microactivity test. The feed was a sour import heavy gas oil (SIHGO) and reactions were run at 980° F. The additives were blended with Octacat®, a USY-based cracking catalyst produced by Davison Chemical Company. The blends were prepared by physical mixture and contained 5% by weight additive and 95% by weight Octacat®. Prior to blending, the additives were steam deactivated at 1382° F. for 4 hrs, 95% steam and the Octacat® was steam deactivated at 1450° F. for 4 hrs, 100% steam.

Table 1 below shows the results of the cracking experiments for the three additive blends as well as for the reference Octacat® containing no additives.

TABLE 1

Interpolated MAT Results of Cation
Exchanged ZSM-5 Additives with Octacat ®
Test Conditions: 980° F., SIHGO FEED
95:5 wt % Octacat ®:Additives

|  | Octacat ® | Octacat ® + ZSM-5 | Octacat ® + Ca-ZSM-5 | Octacat ® + Mg-ZSM-5 |
|---|---|---|---|---|
| C/O | 3.2 | 3.3 | 3.7 | 3.3 |

TABLE 1-continued

Interpolated MAT Results of Cation
Exchanged ZSM-5 Additives with Octacat ®
Test Conditions: 980° F., SIHGO FEED
95:5 wt % Octacat ®:Additives

|  | Octacat ® | Octacat ® + ZSM-5 | Octacat ® + Ca-ZSM-5 | Octacat ® + Mg-ZSM-5 |
|---|---|---|---|---|
| WHSV, hr$^{-1}$ | 37.5 | 36.4 | 32.4 | 36.4 |
| Conversion | 60.0 | 60.0 | 60.0 | 60.0 |
| Product Yields, wt % | | | | |
| Light Gas (C1–C4) | 15.2 | 22.7 | 21.1 | 20.5 |
| Gasoline (C5–C12) | 42.0 | 34.7 | 36.3 | 37.1 |
| LCO | 23.3 | 22.7 | 22.1 | 22.7 |
| Bottoms | 17.0 | 17.5 | 18.0 | 17.2 |
| Coke | 1.9 | 2.0 | 2.4 | 2.1 |
| Gasoline Composition, wt % | | | | |
| n-paraffins | 4.6 | 4.6 | 4.5 | 4.5 |
| isoparaffins | 31.2 | 29.0 | 30.2 | 29.8 |
| olefins | 24.3 | 25.1 | 25.0 | 25.2 |
| naphthenes | 9.7 | 9.2 | 9.0 | 9.2 |
| aromatics | 29.4 | 31.1 | 30.6 | 31.0 |
| Calculated Octane Numbers | | | | |
| RON | 90.9 | 93.0 | 93.0 | 92.8 |
| MON | 80.2 | 81.6 | 81.7 | 81.6 |
| RON Barrels | 38.2 | 32.3 | 33.8 | 34.4 |
| MON Barrels | 33.7 | 28.3 | 29.7 | 30.3 |
| ΔMON/ΔGasoline | — | 0.19 | 0.26 | 0.29 |

From Table 1, at constant conversion of 60 wt %, all three ZSM-5 additive blends produced comparable octane increases over the reference Octacat ®. However, the gasoline yield penalty associated with this octane increase is significantly reduced for the modified additives. Compositionally, the cation-exchanged additives produced a more isoparaffin-rich gasoline.

EXAMPLE 6

The following example compares the catalytic performance of the modified ZSM-5 additives prepared in Example 2 with the unmodified ZSM-5 additive. The modified additive were blended with Octacat ® as 90:10 wt % Octacat ®:Additive as indicated in Table 2. The unmodified additive was tested at two levels: 90:10 wt % and 95:5 wt % Octacat ®:Additive. Prior to catalytic evaluation all of the additives were steam deactivated at 1500° F. for 4 hrs, 95% steam and the Octacat ® was steam deactivated at 1450° F. for 4 hrs, 100% steam. The samples were tested via gas oil cracking as described in Example 5 above.

Table 2 below shows the results of the cracking experiments for the four additive blends as well as the reference Octacat ® containing no additives.

TABLE 2

Interpolated MAT Results of Modified
Additive O—HS Mixtures with Octacat
Test Conditions: 980° F., SIHGO FEED
90:10 wt % Octacat ®:Additives

|  | Octacat ® | 10% ZSM-5 | 5% ZSM-5 | 10% Ca-ZSM-5 |
|---|---|---|---|---|
| C/O | 4.2 | 4.6 | 4.1 | 4.7 |
| WHSV, hr$^{-1}$ | 28.6 | 26.1 | 29.3 | 25.5 |
| Conversion | 60.0 | 60.0 | 60.0 | 60.0 |
| Product Yields, wt % | | | | |
| Light Gas (C1–C4) | 17.1 | 25.4 | 22.8 | 20.3 |
| Gasoline (C5–C12) | 40.3 | 31.9 | 34.5 | 36.7 |
| LCO | 23.2 | 22.3 | 22.8 | 22.8 |
| Bottoms | 16.7 | 17.7 | 17.1 | 17.1 |
| Coke | 2.2 | 2.3 | 2.5 | 2.8 |
| Gasoline Composition, wt % | | | | |
| paraffins | 3.8 | 4.1 | 3.6 | 3.5 |
| isoparaffins | 33.3 | 28.9 | 30.7 | 32.1 |
| olefins | 23.9 | 26.0 | 25.7 | 24.6 |
| naphthenes | 9.4 | 8.1 | 8.9 | 8.7 |
| aromatics | 29.7 | 32.9 | 31.1 | 31.0 |
| Calculated Octane Numbers | | | | |
| RON | 91.1 | 94.1 | 93.3 | 93.0 |
| MON | 80.6 | 82.3 | 81.9 | 81.8 |
| RON Barrels | 37.2 | 30.0 | 32.2 | 34.1 |
| MON Barrels | 32.5 | 26.3 | 28.3 | 30.0 |
| ΔMON/ΔGasoline | — | .20 | .22 | .33 |

From Table 2, at constant conversion of 60 wt %, all three ZSM-5 additive blends produced comparable octane increases over the reference Octacat ®. However, as in Example 5, the gasoline yield penalty associated with this octane increase is significantly reduced for the modified additive. This is shown by comparison of the octane/gasoline tradeoff, i.e. the ratio of MON increase to gasoline yield decrease, ΔMON/ΔGasoline. Comparison of this ratio shows a significant advantage for the modified additive.

EXAMPLE 7

The following example compares the catalytic performance of the modified ZSM-5 additive prepared in Example 4 with the unmodified ZSM-5 additive and a high-silica (silicalite) ZSM-5 based additive. The silicalite additive consists of 15% silicalite zeolite spray-dried with 85% matrix in identical formulation as the ZSM-5 based additive. The additives were blended with Octacat ® at the 3–3.5 wt % levels shown in Table 3. Prior to catalytic evaluation all of the additives and the Octacat ® base catalyst were steam deactivated at 1500° F. for 4 hrs, 100% steam. The samples were tested via gas oil cracking in a circulating riser pilot plant reactor described in detail in NPRA Paper No. AM88-52, presented at the 1988 NPRA Annual Meeting, Mar. 20–22, 1988 in San Antonio, Tex. In these experiments, the catalyst was preheated to 1250° F. prior to contacting the hot gas oil, which was preheated to temperatures between 300° and 700° F. Octane numbers were determined using a standard ASTM knock-engine.

Table 3 shows the results obtained for the three additives as well as for the Octacat ® base catalyst containing no additive.

TABLE 3

Riser Cracking Results of Cation Exchanged ZSM-5 Additives with Octacat ®
Test Conditions: 1375° F. catalyst, 300–700° F. feed

|  | Octacat ® | 3.0% ZSM-5 | 3.5% silicalite | 3.5% Sr-ZSM-5 |
|---|---|---|---|---|
| C/O | 5.0 | 5.4 | 5.4 | 5.0 |
| Conversion, vol % | 65.0 | 65.0 | 65.0 | 65.0 |
| Product Yields, vol % | | | | |
| Dry Gas, wt % | 3.1 | 3.1 | 3.0 | 3.0 |
| LPG | 20.2 | 28.2 | 24.7 | 23.4 |
| Gasoline, 430° F. | 55.0 | 49.0 | 51.9 | 52.8 |
| LCO | 18.8 | 18.5 | 18.5 | 18.5 |
| Bottoms | 16.2 | 16.5 | 16.5 | 16.5 |
| Coke, wt % | 2.6 | 2.6 | 2.6 | 2.5 |
| Gasoline Composition, wt % | | | | |
| n-paraffins | 3.6 | 3.4 | 3.3 | 3.3 |
| isoparaffins | 21.7 | 19.5 | 20.3 | 20.3 |
| olefins | 45.0 | 47.2 | 47.8 | 46.0 |
| naphthenes | 9.2 | 8.2 | 8.2 | 8.6 |
| aromatics | 20.4 | 21.7 | 20.4 | 21.7 |
| Octane Numbers | | | | |
| RON | 94.4 | 95.7 | 95.5 | 95.0 |
| MON | 79.4 | 80.3 | 80.3 | 80.3 |
| RON Barrels | 51.9 | 46.9 | 49.6 | 50.2 |
| MON Barrels | 43.7 | 39.3 | 41.7 | 42.4 |
| ΔMON/ΔGasoline | — | .15 | .29 | .41 |

From Table 3, at constant conversion of 65 vol %, all three additive blends produced comparable octane increases over the reference Octacat ®. However, as in Examples 5 and 6, the gasoline yield penalty associated with this octane increase is significantly reduced for the cation-exchanged additive. Also, while the silicalite additive is also effective at reducing the gasoline penalty associated with increased octane, the Sr-modified ZSM-5 additive shows even better performance. Thus, the cation modification of ZSM-5 represents a significant advantage over existing octane additives.

It is understood that the foregoing detailed description is given merely by way of illustration and that many variations may be made therein without departing from the spirit of this invention.

What is claimed is:

1. In an FCC catalyst for the catalytic cracking of hydrocarbons wherein said catalyst comprises a conventional cracking catalyst dispersed in an inorganic matrix and a zeolite additive composition comprising a medium-pore zeolite selected from the group consisting of ZSM-5, ZSM-11, ZSM-12, ZSM-23, ZSM-35, and ZSM-38 with a Constraint Index from about 1 to about 12 and a silica to alumina mole ratio greater than about 12, the improvement comprising exchanging the zeolite additive with cations selected from one or more elements of Group IA, Group IIA or Group IIIA excluding rare earths of the Periodic Table to improve the octane number of the gasoline-range product of an FCC process while reducing the yield loss typically observed for such octane-enhancing additives.

2. An FCC catalyst composition according to claim 1, wherein the cations are selected from one or more elements of Group IIA or Group IIIA.

3. An FCC catalyst composition according to claim 2, wherein the cations are Y, Mg, Ca or Sr.

4. An FCC catalyst composition according to claim 3, wherein the cation is Sr.

5. An FCC catalyst composition according to claim 1, wherein the conventional cracking catalyst is a synthetic faujasite or other large-pore zeolite such as zeolite L, zeolite Omega, ZSM-4, zeolite Beta or Mordenite.

6. An FCC catalyst composition according to claim 5, wherein the synthetic faujasite is Y zeolite.

7. An FCC catalyst composition according to claim 1, wherein the medium pore zeolite is ZSM-5.

8. An FCC catalyst composition according to claim 7, wherein the Y zeolite is in the ultrastable form.

9. An FCC catalyst composition according to claim 7, wherein the ratio of the change in MON (from a conventional cracking catalyst without any ZSM-5 additive) to the negative change of gasoline product yield is a value of preferable at least 0.25.

10. An FCC catalyst composition according to claim 1, wherein said exchanged medium-pore zeolite composition is also dispersed in said matrix as a separate oxide phase.

11. An FCC catalyst composition according to claim 10, wherein said composition is spray dried into particles having a size less than 200 microns.

12. An FCC catalyst composition according to claim 1, wherein said exchanged medium-pore zeolite composition is present in said composition as a separate particulate additive in an inorganic matrix.

* * * * *